(12) United States Patent
Wohlrab

(10) Patent No.: US 7,399,441 B2
(45) Date of Patent: Jul. 15, 2008

(54) CLAMPING UNIT WITH A PLATEN HYDROSTATICALLY SUPPORTED ON A FRAME ELEMENT

(75) Inventor: Walter Wohlrab, Weissenburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 11/673,164

(22) Filed: Feb. 9, 2007

(65) Prior Publication Data
US 2007/0126154 A1    Jun. 7, 2007

Related U.S. Application Data

(63) Continuation of application No. PCT/EP2005/053870, filed on Aug. 5, 2005.

(30) Foreign Application Priority Data
Aug. 19, 2004    (DE) .................. 10 2004 040 194

(51) Int. Cl.
*B29C 45/64* (2006.01)
(52) U.S. Cl. .............. 264/328.1; 425/450.1; 425/451.9; 425/589; 425/595
(58) Field of Classification Search ............. 425/589, 425/595, 450.1, 451.9; 264/328.1, 328.9
See application file for complete search history.

(56) References Cited

U.S. PATENT DOCUMENTS 3,508,430 A  *  4/1970  Edmondson ............ 72/456
3,903,993 A     9/1975  Vorrhees et al.
4,048,841 A     9/1977  Kent
4,222,731 A     9/1980  Enrietti et al.
4,315,728 A  *  2/1982  Hehl ...................... 425/589
4,457,684 A  *  7/1984  Gram ..................... 425/451.9

FOREIGN PATENT DOCUMENTS

| DE | 19 04 998 A1 | 11/1969 |
| DE | 30 06 230 A1 | 8/1981 |
| DE | 196 02 738 A1 | 8/1996 |
| EP | 1 375 121 A | 1/2004 |
| JP | 10 193388 A | 7/1998 |
| JP | 2001 079852 | 3/2001 |

* cited by examiner

*Primary Examiner*—James Mackey
(74) *Attorney, Agent, or Firm*—Henry M. Feiereisen

(57) ABSTRACT

A clamping unit, particularly for an injection molding machine, includes at least one moving platen which is moveably arranged on a frame element. At least one hydrostatic support is provided in an area between the platen and the frame element for facilitating back and forth displacement of the moving platen to thereby avoid speed-dependent friction values. Operation of the clamping unit is realized by building up pressure in a hydrostatic support before the moving platen is initiated for displacement so that the moving plate is slightly raises platen in relation to the frame element. After displacement of the moving platen, the pressure in the hydrostatic support is decreased again.

23 Claims, 3 Drawing Sheets

CLAMPING UNIT WITH A PLATEN HYDROSTATICALLY SUPPORTED ON A FRAME ELEMENT

CROSS-REFERENCES TO RELATED APPLICATIONS

This application is a continuation of prior filed copending PCT International application no. PCT/EP2005/053870, filed Aug. 5, 2005, which designated the United States and has been published but not in English as International Publication No. WO 2006/018400 and on which priority is claimed under 35 U.S.C. §120, and which claims the priority of German Patent Application, Serial No. 10 2004 040 194.2, filed Aug. 19, 2004, pursuant to 35 U.S.C. 119(a)-(d), the contents of which are incorporated herein by reference in its entirety as if fully set forth herein.

BACKGROUND OF THE INVENTION

The invention relates to a clamping unit, in particular for an injection molding machine.

Nothing in the following discussion of the state of the art is to be construed as an admission of prior art.

Clamping units, in particular for injection molding machines, typically include two platens for receiving molding tools, with at least one platen movably supported on a machine bed. This moving platen can travel back and forth for closing and opening the clamping unit and is typically supported on a frame element of a machine bed by a sliding bearing with hydrodynamic lubrication. Thus, a lubricant is introduced or applied between the bearing elements, and a lubricating film is formed during a sliding motion between the elements to be supported. The lubricant can be introduced, for example, via a lubrication groove. The friction coefficient in such a hydrodynamic lubrication or bearing support is speed-dependent, whereby friction decreases at relatively high speeds. The lower the speed, the greater is typically the increase in the friction due to a possible reduced thickness of the lubricating film (slip-stick effect, static friction effects). This effect is particularly disadvantageous, when safety-related issues must be ascertained at the end of a closing movement. Such safety-related issues may relate to a jamming of a not fully finished product between the two platens or a protrusion of a foreign object into the clamping unit. Such a problematic situation should be detected as quickly as possible and with a high sensitivity. In particular, when a slow end motion of the closing operation is involved, application of a greater force has been required heretofore as a result of the increase in friction, so that the sensitivity of the detection of malfunctions could not be sufficiently ensured.

It would therefore be desirable and advantageous to provide an improved clamping unit for an injection molding machine, to obviate prior art shortcomings and to attain a displacement of the movable platen with constant low friction also at low travel speeds of the moving platen.

SUMMARY OF THE INVENTION

According to one aspect of the invention, a clamping unit, in particular for an injection molding machine, includes a frame element, at least one moving platen movably supported on the frame element, and at least one hydrostatic support formed between the moving platen and the frame element for facilitating back and forth displacement of the moving platen on the frame element.

As a consequence of the hydrostatic support produced at least during the travel motion of the moving platen, it is possible to maintain the friction between the moving platen and the frame element, on which the moving platen moves, at an almost constant low level, in particular independent from the movement speed of the platen. The force required to move the moving platen can then be kept small even at low speeds so that malfunctions—in particular those relating to safety—can be easily detected. The hydrostatic support is hereby implemented as a hydraulic support which is produced or can be produced also in a static state of the platen. During movement, the moving platen rests essentially on a "pad" of hydraulic fluid formed between the moving platen and the frame element. The "pad" can, of course, also be attained pneumatically. Accordingly, the term hydraulic should be broadly interpreted and includes also pneumatic fluids, such as air.

The frame element can, for example, include a slide plate which in turn is arranged on a machine frame. A slide rail is movably arranged on the slide plate. The slide rail is firmly connected, directly or indirectly, with the moving platen. The hydraulic support is then established between the slide rail and the slide plate. The term slide rail should also be interpreted broadly and generally relates to the element which directly slides on the slide plate.

When the hydrostatic support is established, pressure is ultimately applied to a hydraulic fluid (or also a pneumatic fluid), thereby forming a pressure pad between the moving platen and the frame element, or between the slide rail and the slide plate. The movement can now occur on this pressure pad at little friction and with a speed-independent friction coefficient, whereby the platen "floats" like on a pad.

This "pad" can be produced by various means. One option using a hydraulic fluid would be the arrangement of a pressure piston acting in or on the slide rail, wherein the piston, when operated, introduces a hydraulic fluid and transports the hydraulic fluid between the slide rail and the slide plate. Of course, suitable sealing arrangements must be provided to prevent the hydraulic fluid from escaping into the environment.

When using air, a support a similar as in a Hovercraft boat may be selected.

According to another feature of the present invention, a hydraulic feed unit and a hydraulic discharge unit can be arranged, in particular on the sides of the moving platen. A hydraulic exchange should occur spatially between the hydraulic feed unit and the hydraulic outlet unit, which hydraulic exchange extends, on the other hand, between the slide plate and the platen to be supported, in particular the slide rail. The hydraulic feed unit is preferably coupled with a hydraulic pump for supplying the hydraulic fluid.

According to another feature of the present invention, the hydraulic pump may be implemented as a volume flow pump with an adjustable volume flow. The degree by which the platen is lifted from the frame element is hereby automatically adjusted. A constant volume flow is then defined and guaranteed between the hydraulic feed unit and the hydraulic outlet unit. If the flow cross-section between the slide rail and the slide plate is too large (due to an excessive lift), the pressure decreases and the distance between the platen and the frame element decreases. If the distance is too small (due to intimate contact), the pressure increases and the distance between the moving platen and the frame element increases again. In this way, a predefined constant volume flow establishes a defined distance between the platen and the frame element, and between the slide rail and the slide plate. The hydraulic pump or hydraulic pumps can be driven, for example, by a motor, whereby a motor can be provided for each hydraulic pump or for a group of hydraulic pumps.

According to another feature of the present invention, an exit opening for the hydraulic fluid, which is arranged in the slide rail on the side of the slide plate, may be arranged peripherally about an entry opening for the hydraulic fluid, which is also arranged in the slide rail facing the slide plate. The hydraulic fluid exit opening can hereby be formed, for example, in the shape of a disk, whereby a hydraulic feed line terminates in this volume. The hydraulic fluid entry opening can be designed of ring-shaped configuration for example, and connected with a hydraulic return line.

According to another feature of the present invention, the hydraulic fluid entry openings and the hydraulic fluid exit openings may also be implemented in other ways, for example in the form of a circular ring shaped hydraulic fluid exit opening and a central hydraulic fluid entry opening. Other geometries can also be selected. It is only significant in this context that fluid exchange is enabled between the hydraulic fluid exit opening and the hydraulic fluid entry opening, wherein the fluid flow between the platen and the frame element or between the slide rail and slide plate causes formation of a hydraulic pad which is sealed against the outside environment. In the afore-described embodiment with circular ring shaped hydraulic fluid entry opening, a sealing ring can be inserted in the opening as a sealing element.

As a result of this design, a constriction can be established between the hydraulic fluid entry opening and the hydraulic fluid exit opening as well as between the slide rail and the slide plate, whereby the dimension of the constriction during operation is defined by the predetermined volume flow and the pump characteristic (pressure buildup capability).

The moving platen can be elevated to different heights depending on the predefined volume flow.

To maintain the hydraulic fluid under a bias pressure in the return loop using the hydrodynamic solution, a spring-biased check valve may be provided in the hydraulic return loop. The spring characteristic determines hereby the biased hydraulic pressure in the return region.

Separate hydraulic flow controllers may be arranged upstream of each hydraulic support to ensure that the identical hydraulic volume stream flows through each individual hydraulic support.

According to another feature of the present invention, the moving platen may be supported on two sides, with a hydrostatic support on both sides. As viewed in displacement direction, two or more hydraulic supports may be provided depending on the size of the moving platen. If a slide shoe is arranged on the moving platen to provide additional support, a hydraulic support can then be arranged directly underneath the platen as well as underneath the slide shoe.

According to another aspect of the invention, a method of operating a clamping unit, in particular for an injection molding machine, includes the steps of building up pressure in a hydrostatic support before displacing a moving platen to slightly raise the moving platen in relation to a frame element on which the moving platen is movably supported, displacing the moving platen, and decreasing the pressure in the hydrostatic support after displacement of the moving platen.

In accordance with the present invention, there is thus no need to continuously maintain the hydrostatic support. Rather, it is also sufficient to generate the hydrostatic support only during the time of platen movement. During the actual injection process and during the subsequent dwell pressure and hardening processes, which can last quite some time for large parts, there is no need to maintain the hydrostatic support. In this case, the hydrostatic support can be switched off, so that the platen is lowered directly onto the frame element and the slide rail is caused to rest directly on the slide plate after dissipation of the respective pressure pad.

Hydraulic pressure (or also pneumatic pressure) could thus be built up in the hydrostatic support at least shortly before the moving platen is displaced to thereby slightly raise the moving platen from the frame element. The moving platen is then displaced (opened or closed). Subsequently, the pressure for the hydrostatic support can again be decreased, and established once more shortly before the moving platen is displaced again.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
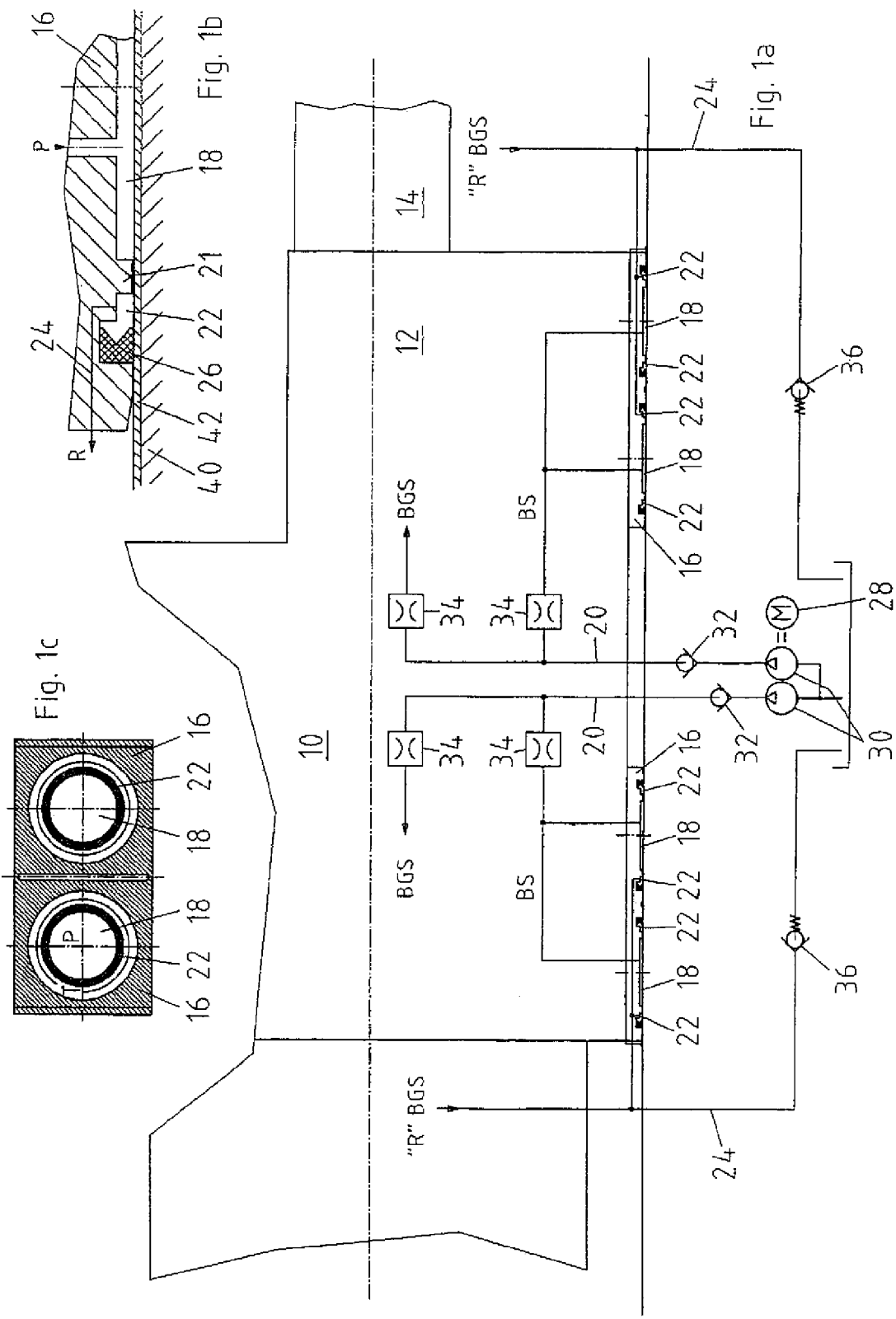
FIG. 1a shows a schematic illustration of a hydraulic switching diagram for a clamping unit according to the invention.
FIG. 1b shows a detailed cross-sectional view of a hydrostatic support for the moving platen of a clamping unit according to the invention.
FIG. 1c shows a schematic illustration of a slide rail for a clamping unit according to the invention from below.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
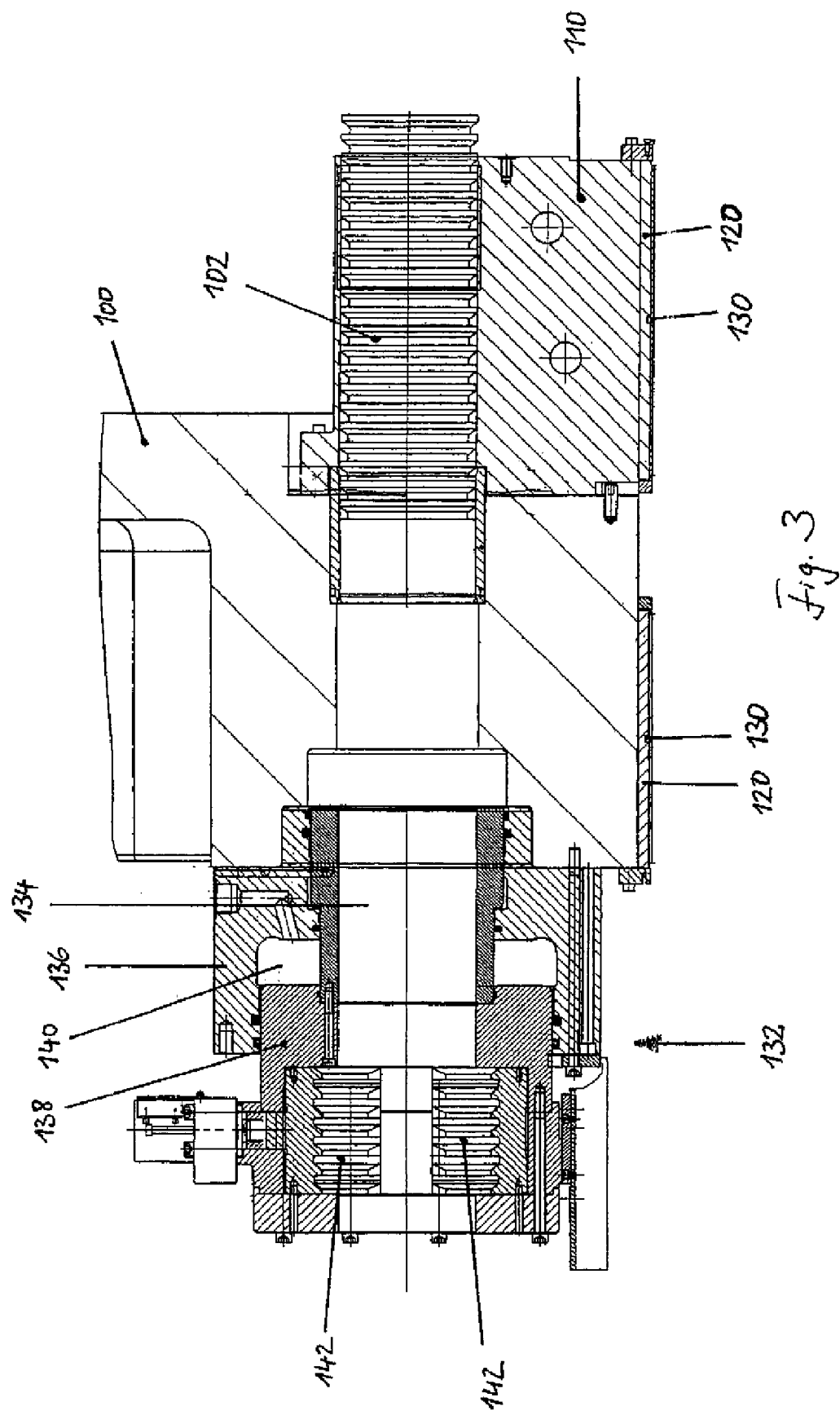
FIG. 3 shows a schematic partial illustration of a moving platen for a clamping unit according to the state of the art.

Turning now to the drawing, and in particular to FIG. 3, there is shown a conventional hydrodynamic support of a moving platen of a clamping unit. The moving platen 100 is illustrated in FIG. 3 only in a cross-section through the lower part. On the side of the mold, a slide shoe 110 is arranged adjacent to the moving platen 100 on each side of the support (only one slide shoe is shown here) for providing additional support for the platen, in particular when heavy molding tools are involved. Both the moving platen 100 and the slide shoe 110 are received and guided on a slide plate of a machine bed (not shown in detail) for allowing a back and forth movement of the moving platen 100 together with the slide shoe 110.

Slide rails 120 are shown on the moving platen 100 as well as on the slide shoe 110 for direct contact with the aforementioned slide plates. The slide rails 120 have lubrication grooves 130 via which lubricant can be introduced between the slide rails 120 and the slide plates.

A tie rod 102, which is firmly connected on one (not shown) side to a fixed platen and has a free end 134 on the other side, extends in an opening through the slide shoe 110 and the moving platen 100. A section of the tie rod 102 is provided with engagement grooves. In a fully assembled clamping unit, two, three or four tie rods are arranged at the respective corners of the clamping unit. A locking and clamping device 132 is associated with each tie rod 102. The locking and clamping device 132 includes a clamping member which has as a core element two locking jaws 142 that can be opened and closed radially with respect to the rod. The closing member of the locking and clamping device 132 also includes a hydraulic cylinder 136 attached to the moving platen and a hydraulic piston 138 integrally formed with the locking unit. A workspace 140 is formed between the hydraulic cylinder 136 and the hydraulic piston 138 for introduction of a pressure fluid via a hydraulic bore.

FIG. 3 shows the moving platen in open position. To close the moving platen 100, the latter is moved by a hydraulic drive (not shown) to the right (in the Figure), thereby moving the tie rod 102 relative to and through the platen 100. At the end of the closing movement, the two locking jaws 142 are positioned in the groove region of the rod 102. Both locking jaws 142, which in FIG. 3 are in the open position, are then moved towards each other and engage in the grooves of the tie rod 102. After this locking, hydraulic pressure is applied in the workspace 142 to generate the clamping force and to press the moving platen against the stationary platen.

During the movement of the moving platen 100, lubricant introduced between the slide rails 120 and the slide plates produces a hydrodynamic support which, however, has speed-dependent friction characteristics.

Figure 2:
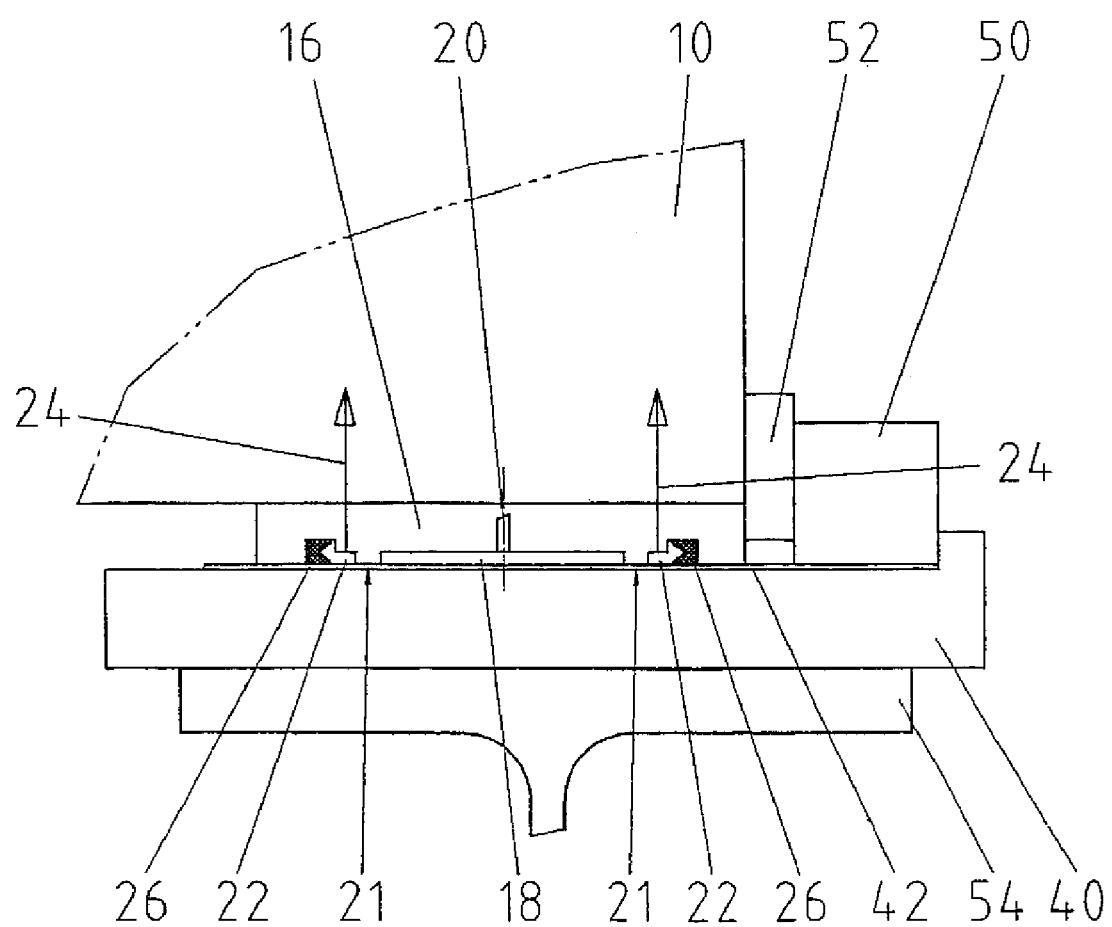
FIG. 2 shows another detailed cross-sectional view of a hydrostatic support for a clamping unit according to the invention perpendicular to the displacement direction.

Reference is now made to FIGS. 1a-1c and 2 which show a clamping unit according to the present invention, by which speed-dependent friction is eliminated through formation of a hydrostatic support between a moving platen 10 and a frame element. FIGS. 1b and 2 show schematic representations through the region of a hydrostatic support in accordance with the present invention, with FIG. 1b illustrating a cross-sectional view from the side, and with FIG. 2 illustrating a view perpendicular to the clamping direction.

The frame element includes a support plate 40 which is arranged, in particular welded, on a support 54 which is part of a machine bed not shown in detail. The support plate 40 has a hardened surface 42 and a lateral guide rail (not labeled) which projects upwardly like a nose and extends parallel to the opening and closing movements. Only one lower corner of the moving platen 10 is depicted in FIG. 2. The opposing lower corner of the moving platen 10 has a mirror-symmetric configuration.

Two slide rails 16 are arranged on each side on the bottom side of the moving platen 10. Each slide rail 16 rests directly on the hardened surface 42 of the associated support plate 40. Two circular disk-shaped recesses 18, which are spaced apart in the opening and closing directions, are arranged on the bottom side of each slide rail 16 (see also FIG. 1c). The ends of hydraulic feed lines 20 terminate in these circular disk-shaped recesses 18.

Ring-shaped recesses 22 are disposed in surrounding coaxial relationship to the disk-shaped recesses 18 and are also open on the side of the support plate. The ring space terminates in a hydraulic outlet line 24, which extends respectively via a spring-biased check valve 36 to a collecting container.

Fixed guide rails 50 extend on both exterior sides along the clamping unit, wherein the slide rail 16 and hence also the moving platen 40 are laterally attached on the outside to the guide rails 50 using an interposed bronze strip. The lateral attachment on the left and right sides of the clamping unit ensures a complete linear guidance.

As mentioned above, a similar device is provided as a mirror image to FIG. 2 on the other bottom side of the moving platen, so that the platen 10 is movably supported on two such linear guides.

A sealing ring 26 is inserted in the ring space 22 to provide a seal between the slide rail 16 and the support plate 40.

In FIG. 1a which primarily shows the hydraulic switching diagram, a slide shoe 12 is formed integrally with the moving platen 10. The slide shoe 12 provides additional support when a heavy mold is mounted on the platen 10. Rods 14, with only one of four rods being visible and schematically indicated in FIG. 1a, extend through the platen 10.

As further seen in FIG. 1a, a motor 28 is provided to drive two pumps 30. The two pumps 30 are connected with the hydraulic feed lines 20, with flow controllers 34 connected between each hydraulic feed line and a corresponding slide rail. The flow controllers 34 ensure that the same quantity of hydraulic fluid is supplied to each slide rail 16.

Four slide rails 16 are provided here, namely a slide rail 16 on the operator side (FIG. 1a) directly underneath the moving platen, a slide rail on the operator side (FIG. 1a) underneath the slide shoe 12, and the same number of slide rails on the so-called operator counterside, i.e., on the opposite side (not shown). It should also be noted that in the present embodiment the bottom side of the slide rails 16 is completely flat, except for the disk-shaped recess 18 and the ring space 22.

The operation of the clamping unit according to the invention with hydrostatic support will now be described. In the open position of the moving platen 10, the hydrostatic support is initially not implemented and the motor 28 is idle. When the moving platen 10 is to be displaced, the motor-pump combination 28, 30 is operated shortly before the start of the travel movement so that a constant volume flow is supplied by the pumps 30. The flow controllers 34 guarantee that constant volume streams reach also the respective slide rails 16.

The conveyed hydraulic fluid flows from the feed lines 20 into the cylindrical recesses 18, with the hydraulic pressure continuously increasing to a certain level. When the hydraulic pressure exceeds a value determined by the weight of the moving platen, the platen is slightly elevated, thereby establishing a flow connection between each disk-shaped recess 18 and the ring space 22, which surrounds this recess, via a corresponding ring-shaped constricting gap 21. The hydraulic fluid then flows via this constricting gap 21 into the ring space, from where it is returned to the collecting container via the hydraulic outlet line 24. The spring-biased check valve 36 ensures that a certain pressure (bias pressure) is always maintained in the return line.

As a result of the constant volume flow supply from the pumps 30, a certain spacing is established between the slide rails 16 and the support plates 40 which corresponds to the height of the constricting gap 21. To prevent hydraulic fluid from escaping to the ambient environment, a sealing ring 26 is applied. Such seal is commercially available, for example, by the company Simrit in the form of a grooved ring with U-spring.

If the distance between the slide rails 16 and the support plates 40 were to become excessive, the flow cross-section at the constriction sites will increase, allowing more hydraulic fluid to flow from the disk-shaped recess 18 to the ring space 22. As a consequence, the pressure decreases, and the slide rail 16 together with the moving platen 10 are again lowered slightly downwards. When the constriction cross-section becomes too small, the pressure in the disk-shaped recess increases and the slide rail 16 together with the mounted moving platen 10 are again slightly elevated. The height of the hydraulic fluid pad can thereby be determined using a pump 30 with a constant volume flow. Moreover, only the fluid pressure determined by the spring in the check valve 36 is generated radially outside the constriction region 21. This prevents the seal 26 from being subjected to excessive pressure. By using a hydrostatic support configured in this manner, the platen floats on the formed hydraulic pads, resulting in a constant friction value independent on the speed, when the moving platen is moved. The required pump can have a small size. A pressure in the range of 40 bar may be sufficient even for large machines. The flow rate depends on the constriction cross-section and hence depends on the height by which the platen is elevated from the frame element. Because several micrometers are sufficient, the volume flow can also be kept within limits.

Of course, the present invention can also be implemented in other ways. It is only significant that between the moving platen and the frame unit on which the moving platen is supported, one or more hydrostatic supports are provided to prevent direct contact between the parts to be supported and to ensure a speed-independent support. In this context, a pneumatic support can be realized similar to a Hovercraft vessel. Using air would also have the advantage that air can be released directly into the environment and therefore does not require a return line. However, the noise level may increase.

The moving platen with slide plates thus rests on a guide track of the machine bed. The slide plates are configured to form pressure fields which can in turn be surrounded by ring-shaped return channels which are sealed by means of seals. The pressure fields are supplied with a pressure fluid (e.g., hydraulic oil) by separate pumps and flow dividers. The pressure fields are separated from the return channels by a circumferential constriction ridge.

Before the moving platen 10 begins to move, the pressure supply of the pressure fields is activated. The flow dividers supply the same quantity of oil to each pressure field. The pressure in the pressure fields increases according to the load exerted by the weight of the platen and the weight of the molding tool. When the force exerted by the pressure in the pressure fields exceeds the force exerted by this weight, the moving platen is raised by a distance in the range of micrometers, wherein the excess pressure fluid flows through the annular constriction cross-section into the return line. Different combined loads are automatically equalized by way of the pressure fields. During the movement of the moving platen, the platen "floats" on the pressure fields, thereby ensuring that friction is independent from the speed of the platen. At the end of the movement, the pressure supply is switched off, whereafter the moving platen10 again rests on the slide plates.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A clamping unit, in particular for an injection molding machine, comprising:
  a frame element;
  at least one moving platen movably supported on the frame element; and
  at least one hydrostatic support formed between the moving platen and the frame element for facilitating back and forth displacement of the moving platen on the frame element,
  wherein the frame element comprises at least one slide plate and at least one slide rail mounted on the moving platen above the slide plate, said hydrostatic support being implemented in form of one or more pressure pads disposed between the at least one slide plate and the at least one slide rail, and
  wherein the hydrostatic support comprises a hydraulic feed unit and a hydraulic outlet unit, with the pressure pad being formed as a result of hydraulic exchange between the hydraulic feed unit and the hydraulic outlet unit.

2. The clamping unit of claim 1, wherein the hydraulic exchange is established between the slide plate and the slide rail.

3. The clamping unit of the claim 1, wherein the hydrostatic support includes a hydraulic pump coupled with the hydraulic feed unit.

4. The clamping unit of claim 3, wherein the hydraulic pump is implemented as a volume flow pump with an adjustable volume flow.

5. The clamping unit of claim 3, further comprising at least one motor configured for driving the hydraulic pump or a plurality of hydraulic pumps.

6. The clamping unit of claim 1, wherein the slide rail has a slide plate proximal side formed with at least one hydraulic fluid exit opening which is peripherally surrounded by a hydraulic fluid entry opening which faces the slide plate.

7. The clamping unit of claim 6, wherein the hydraulic fluid exit opening is implemented as a disk-shaped recess for fluid communication with a hydraulic feed line.

8. The clamping unit of claim 6, wherein the hydraulic fluid entry opening is implemented as a circular ring for fluid communication with a hydraulic outlet line.

9. The clamping unit of claim 6, further comprising a sealing element formed in the hydraulic fluid entry opening for sealing a space between the slide rail and the slide plate, wherein the hydraulic fluid exit opening is disposed radially inside the sealed space.

10. The clamping unit of claim 9, wherein the sealing element is a sealing ring.

11. The clamping unit of claim 6, wherein a constriction is formed between the slide rail and the slide plate, when the hydrostatic support is established between the hydraulic fluid exit opening and the hydraulic fluid entry opening.

12. The clamping unit of claim 1, further comprising a check valve arranged in the hydraulic outlet unit.

13. The clamping unit of claim 1, further comprising a hydraulic flow controller arranged in the hydraulic feed unit upstream of the hydrostatic support.

14. The clamping unit of claim 1, further comprising a further said hydrostatic support, wherein the moving platen is supported on one side by the hydrostatic support and on another side by the further hydraulic support.

15. The clamping unit of claim 14, further comprising a plurality of said hydrostatic support for supporting each side of the moving platen by two or more of the plurality of hydrostatic supports which are spaced apart in a displacement direction of the moving platen.

16. The clamping unit of claim 1, further comprising a slide shoe arranged on the moving platen for added support, and a plurality of said hydrostatic support for disposition directly underneath the moving platen and underneath the slide shoe.

17. The clamping unit of claim 16, wherein the slide shoe is integrated with the moving platen.

18. The clamping unit of claim 16, wherein the slide shoe is a separate element attached to the moving platen.

19. A clamping unit, in particular for an injection molding machine, comprising:
   a frame element;
   at least one moving platen movably supported on the frame element;
   at least one hydrostatic support formed between the moving platen and the frame element for facilitating back and forth displacement of the moving platen on the frame element; and
   a plurality of said hydrostatic support, and a plurality of hydraulic pumps provided for the hydrostatic supports in one-to-one correspondence.

20. A clamping unit, in particular for an injection molding machine, comprising:
   a frame element;
   at least one moving platen movably supported on the frame element;
   at least one hydrostatic support formed between the moving platen and the frame element for facilitating back and forth displacement of the moving platen on the frame element; and
   a plurality of said hydrostatic support defining groups of hydrostatic supports, and a plurality of hydraulic pumps provided for the groups of hydrostatic supports in one-to-one correspondence.

21. A method of operating a clamping unit, comprising the steps of:
   building up pressure in a hydrostatic support before displacing a moving platen to slightly raise the moving platen in relation to a frame element on which the moving platen is movably supported;
   displacing the moving platen; and
   decreasing the pressure in the hydrostatic support after displacement of the moving platen.

22. The method of claim 21, further comprising the step of supplying the hydrostatic support with a predetermined quantity of hydraulic fluid per unit of time.

23. The method of claim 21, further comprising the step of adjusting a hydraulic bias pressure in a hydraulic outlet line for the hydrostatic support by a check valve.

* * * * *